United States Patent
Kim

(10) Patent No.: US 11,724,731 B2
(45) Date of Patent: Aug. 15, 2023

(54) STEERING REACTION FORCE APPARATUS FOR VEHICLE

(71) Applicant: HYUNDAI MOBIS CO., LTD., Seoul (KR)

(72) Inventor: Il Ryong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/856,416

(22) Filed: Jul. 1, 2022

(65) Prior Publication Data

US 2023/0027163 A1    Jan. 26, 2023

(30) Foreign Application Priority Data

Jul. 20, 2021 (KR) .................. 10-2021-0094862

(51) Int. Cl.
*B62D 5/00* (2006.01)
*B62D 6/00* (2006.01)
*H02K 7/116* (2006.01)
*B62D 5/04* (2006.01)

(52) U.S. Cl.
CPC ........... *B62D 5/006* (2013.01); *B62D 5/0403* (2013.01); *B62D 6/008* (2013.01); *H02K 7/116* (2013.01)

(58) Field of Classification Search
CPC ...... B26D 5/006; B26D 5/0403; B26D 6/008; H02K 7/116; H02K 21/16
See application file for complete search history.

(56) References Cited

U.S. PATENT DOCUMENTS

| | | | | |
|---|---|---|---|---|
| 7,866,436 B2 * | 1/2011 | Yamanaka | ........... | B62D 5/0415 180/443 |
| 9,683,639 B2 * | 6/2017 | Kogure | .................. | B62D 5/043 |
| 11,247,526 B2 * | 2/2022 | Klank | .................... | B60G 21/10 |
| 11,515,754 B2 * | 11/2022 | Jeong | ........................ | F16H 1/46 |
| 2003/0116376 A1 * | 6/2003 | Uryu | .................... | B62D 5/0415 180/446 |
| 2005/0016791 A1 * | 1/2005 | Fukushima | ............ | B62D 6/008 180/446 |
| 2017/0355051 A1 * | 12/2017 | Hasuda | .................... | F16H 57/08 |
| 2020/0198434 A1 * | 6/2020 | Klank | .................... | B60G 21/10 |
| 2021/0129899 A1 * | 5/2021 | Li | .......................... | B62D 5/006 |

FOREIGN PATENT DOCUMENTS

KR    10-2008-0016945 A    2/2008

* cited by examiner

*Primary Examiner* — Leslie A Nicholson, III
(74) *Attorney, Agent, or Firm* — NSIP Law

(57) ABSTRACT

A steering reaction force apparatus for a vehicle includes: a housing that is openable and closable by a cover unit, a stator unit fixed to an inside of the housing, a rotor unit disposed to face the stator unit and to be rotated by electromagnetic interaction with the stator unit, a transmission shaft unit connected to the rotor unit to rotate in conjunction with the rotor unit, a power transmission unit disposed inside the rotor unit to transmit a rotational force of the transmission shaft unit to a steering shaft, and a retainer unit to support the power transmission unit with respect to the cover unit.

14 Claims, 13 Drawing Sheets

STEERING REACTION FORCE APPARATUS FOR VEHICLE

CROSS-REFERENCE TO RELATED APPLICATION

This application claims priority from and the benefit of Korean Patent Application No. 10-2021-0094862, filed on Jul. 20, 2021, which is hereby incorporated by reference for all purposes as if set forth herein.

BACKGROUND

Field

Exemplary embodiments of the present disclosure relate to a steering reaction force apparatus for a vehicle, and more particularly, to a steering reaction force apparatus for a vehicle, in which a decelerator using a planetary gear is installed.

Discussion of the Background

In general, a power aid steering apparatus is used in a vehicle as a means to reduce a steering force of a steering wheel and to ensure the stability of a steering state.

A Steer By Wire (SBW) system is a steering system that separates a mechanical connection between the steering wheel and a driving wheel of a vehicle, and may steer a vehicle by receiving a rotational signal of the steering wheel through an electronic control unit (ECU), and operating a steering motor connected to the driving wheel based on the obtained rotational signal. The Steer By Wire (SBW) system has advantages such as increasing a degree of freedom of layout according to a steering system configuration, improving fuel efficiency, and removing a disturbance back-input from a wheel, by removing a mechanical connection structure of a steering system in the related art. Meanwhile, since Steer By Wire (SBW) system has no mechanical connection structure, Steer By Wire (SBW) system generates a steering reaction force or a restoring reaction force through the reaction force apparatus using a motor or the like.

A steering reaction force apparatus in the related art is formed of a decelerator and a motor, and the decelerator may include planetary gear rows. A ring gear among the planetary gear rows is assembled to a structure such as a housing due to its structural characteristics, and may be made of a plastic material for weight and cost reduction. However, a plastic ring gear needs to be reinforced rigidity so as to secure a durability of a surface thereof assembled with a snap ring or bolt applied to the related art.

The related art of the present disclosure is disclosed in Korean Patent Application Publication No. 10-2008-0016945 (published on Feb. 22, 2008, and entitled "Electric Power Steering Device").

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to a steering reaction force apparatus for a vehicle, which can firmly support a decelerator inside a motor housing, thereby ensuring weight and cost reduction.

In one general aspect, a steering reaction force apparatus for a vehicle includes: a housing configured to be openable and closable by a cover unit; a stator unit fixed to an inside of the housing; a rotor unit disposed to face the stator unit and configured to be rotated by electromagnetic interaction with the stator unit; a transmission shaft unit connected to the rotor unit and configured to rotate in conjunction with the rotor unit; a power transmission unit disposed inside the rotor unit and configured to transmit a rotational force of the transmission shaft unit to a steering shaft; and a retainer unit configured to support the power transmission unit with respect to the cover unit.

The rotor unit may include: a rotor core; an accommodation unit fixed to an inner circumferential surface of the rotor core and configured to accommodate the power transmission unit inside the rotor core; and a connection unit extended from the accommodation unit and connected to the transmission shaft unit.

The rotor unit may include a stress dispersion unit extended from the accommodation unit and inclined at an angle with respect to the connection unit.

The power transmission unit may include: a sun gear unit extended from the transmission shaft unit and disposed inside the accommodation unit; a ring gear unit spaced apart from the sun gear unit; a plurality of planetary gear units disposed between the sun gear unit and the ring gear unit, and configured to rotate and revolve in conjunction with a rotational force of the sun gear unit; and a carrier unit connected to the steering shaft and configured to rotate in conjunction with a revolution of the plurality of planetary gear units.

The ring gear unit may be formed of a plastic material.

The ring gear unit may include: a ring gear disposed inside the accommodation unit and having an inner circumferential surface engaged with the planetary gear unit; and a flange unit extended from the ring gear and facing the cover unit.

The retainer unit may include: a body unit fixed to an inside of the ring gear unit; an extension unit extended from the body unit and inserted through the cover unit; and a caulking unit disposed at an end of the extension unit, in contact with the cover unit, and configured to support the ring gear unit.

The body unit may be insert-injected into the ring gear unit.

The body unit may include: a first body fixed to the inside of the ring gear; and a second body extended from the first body and fixed to the inside of the flange unit.

The caulking unit may have a diameter larger than a diameter of the extension unit so that a bottom surface of the caulking unit contacts an upper surface of the cover unit.

The retainer unit may include a reinforcing unit disposed in the body unit and configured to enhance a fixing force of the body unit with respect to the ring gear unit.

The reinforcing unit may include a plurality of embossing units protruding to the outside of the body unit and spaced apart from one another at intervals in a circumferential direction of the ring gear unit.

The embossing units may be arranged in at least two rows along an axial direction of the ring gear unit.

The reinforcing unit may include a plurality of penetration units formed through the body unit and spaced apart from each other at intervals in the circumferential direction of the ring gear unit.

The reinforcing unit may include a rolling unit protruding from the body unit to the outside of the ring gear unit, and bent toward the outer circumferential surface of the ring gear unit to be in close contact with the ring gear unit.

The steering reaction force apparatus for a vehicle according to the present disclosure may reduce the length thereof and the number of components as the power transmission unit which transmit a rotational force of the transmission shaft unit to the steering shaft is accommodated in the accommodation unit installed inside the housing.

The steering reaction force apparatus for a vehicle according to the present disclosure may reduce the overall weight of the power transmission unit as the ring gear unit is made of a plastic material, and may reduce production costs.

The steering reaction force apparatus for a vehicle according to the present disclosure may include the reinforcing unit to prevent relative movement between the ring gear unit and the body unit, thereby improving fixing performance and durability between the ring gear unit and the body unit formed of different materials.

Other features and aspects will be apparent from the following detailed description, the drawings, and the claims.

DETAILED DESCRIPTION OF THE ILLUSTRATED EMBODIMENTS

Figure 1:
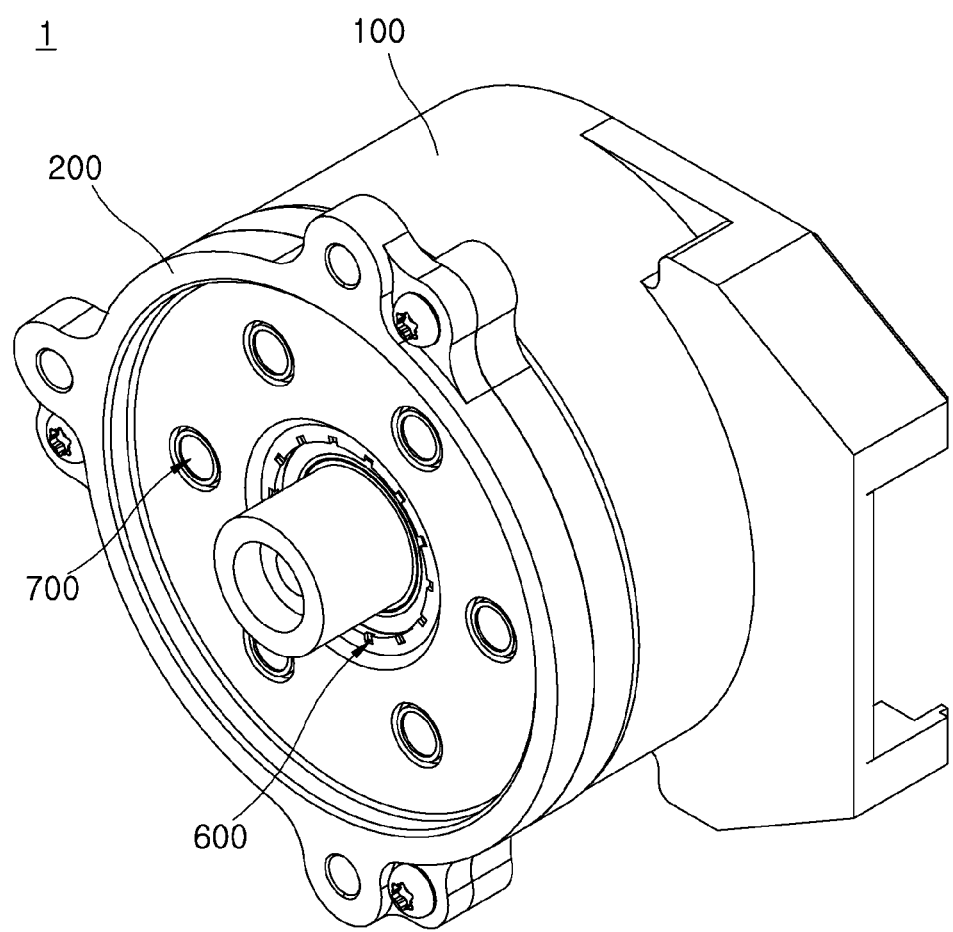
FIG. 1 is a perspective view schematically illustrating the configuration of a steering reaction force apparatus for a vehicle according to an embodiment of the present disclosure.

Hereinafter, a steering reaction force apparatus for a vehicle according to the present disclosure will be described below with reference to the accompanying drawings through various exemplary embodiments.

For clarity and convenience in description, thicknesses of lines, sizes of constituent elements, and the like may be illustrated in an exaggerated manner in the drawings. In addition, terms described below are defined by considering functions according to the present disclosure and may vary according to the intention of a user or a manager or according to the common practices in the art. Therefore, these terms should be defined in light of details disclosed throughout the present specification.

In addition, when referred to as being "connected to (or make contact with)" another constituent element, a constituent element may be "directly connected to (make direct contact with)" the another constituent element or may be "indirectly connected to (or make indirect contact with)" the another constituent with an intervening member interposed therebetween. Throughout the specification, the expression "include (have) a constituent element," means "may further include (or have) any other constituent element," not meaning "exclude any other constituent element," unless otherwise particularly described.

In addition, the same reference numerals throughout the present specification may refer to the same constituent element. The same reference numerals or similar reference numerals, although not shown in a specific drawing, may be described with reference to other drawings. In addition, a constituent element, although not given a reference character in a specific drawing, may be described with reference to another drawing. In addition, the number of, shapes of, and sizes of, constituent elements illustrated in the drawings of the present application and a relative difference between the sizes are defined for convenience of understanding, and may be implemented in various ways without imposing any limitation on embodiments.

Figure 2:
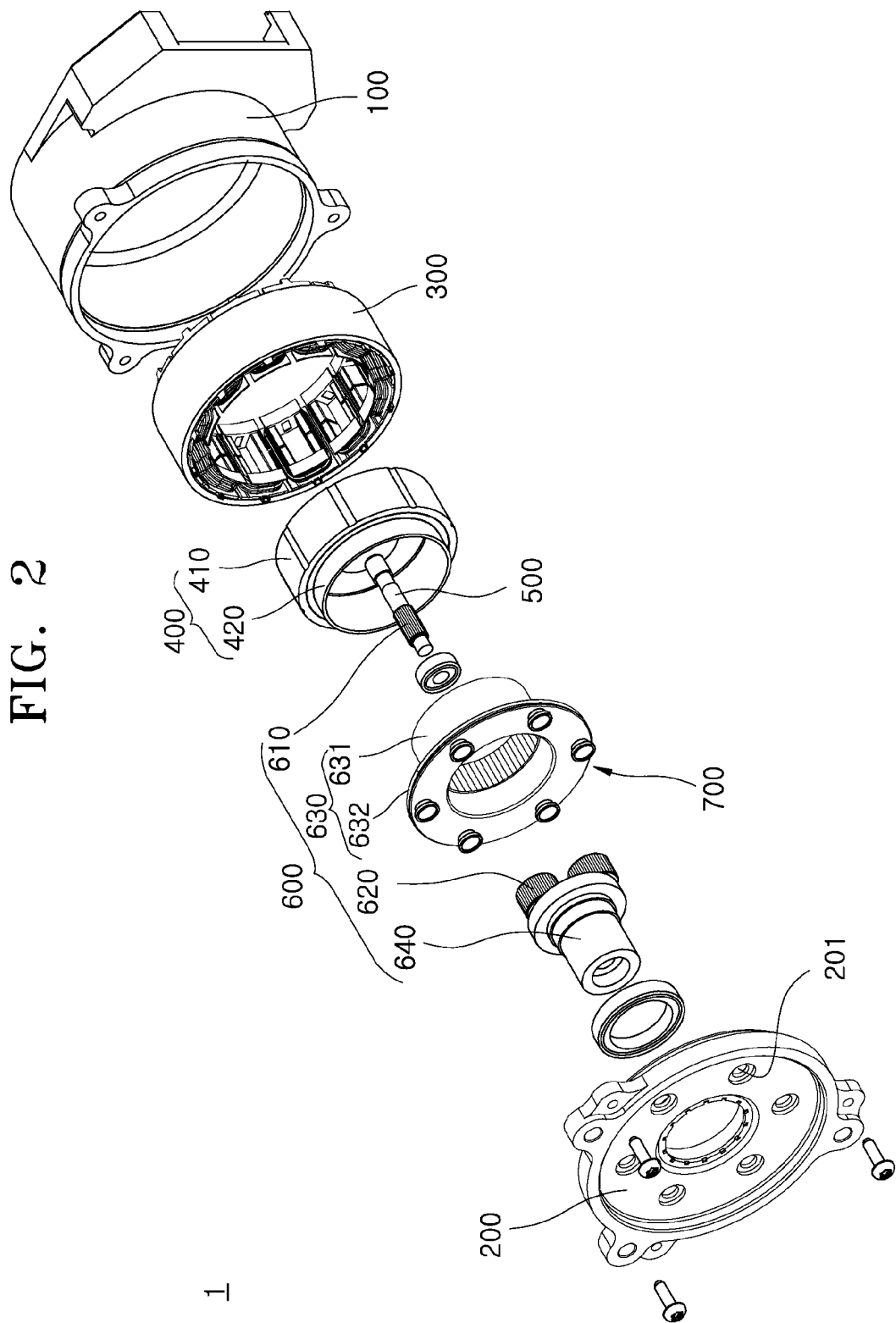
FIG. 2 is an exploded perspective view schematically illustrating the configuration of the steering reaction force apparatus for a vehicle according to the embodiment of the present disclosure.
Figure 3:
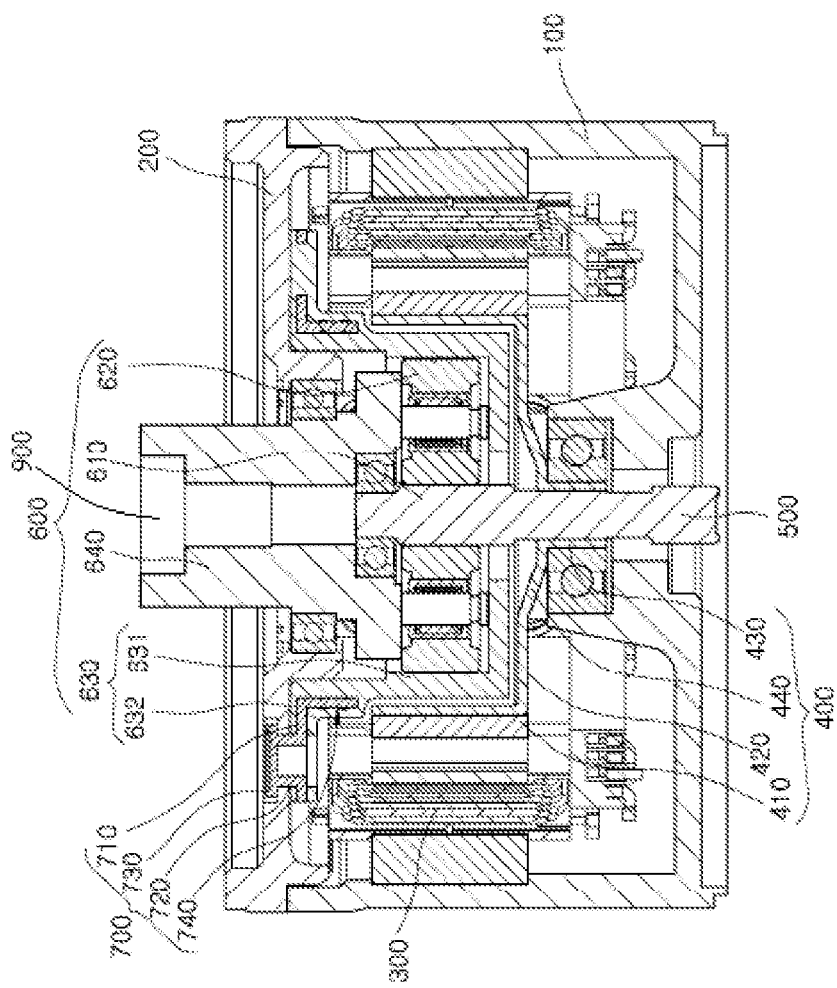
FIG. 3 is a cross-sectional view schematically illustrating the configuration of the steering reaction force apparatus for a vehicle according to the embodiment of the present disclosure.

FIG. 1 is a perspective view schematically illustrating the configuration of a steering reaction force apparatus for a vehicle according to an embodiment of the present disclosure. FIG. 2 is an exploded perspective view schematically illustrating the configuration of a steering reaction force apparatus for a vehicle according to the embodiment of the present disclosure. FIG. 3 is a cross-sectional view schematically illustrating the configuration of the steering reaction force apparatus for a vehicle according to the embodiment of the present disclosure.

Referring to FIGS. 1 to 3, the steering reaction force apparatus 1 for vehicle according to the embodiment of the present disclosure includes a housing 100, a cover unit 200, a stator unit 300, a rotor unit 400, a transmission shaft unit 500, a power transmission unit 600, and a retainer unit 700.

The housing 100 forms a schematic appearance of the steering reaction force apparatus 1 for a vehicle according to the embodiment of the present disclosure. The housing 100 is formed in the shape of a hollow cylinder, and has a space in which the cover unit 200, the stator unit 300, the rotor unit 400, and the transmission shaft unit 500 to be described below may be installed. One side of the housing 100 is formed to be open so that components installed therein may be easily managed and replaced. A specific shape of the housing 100 is not limited to the shape shown in FIGS. 1 to 3, and may be variously changed in design without departing from the technical spirit that the housing 100 has a shape in which each component of the steering reaction force apparatus 1 for a vehicle according to the embodiment of the present disclosure may be installed.

The cover unit 200 is detachably coupled to an open side of the housing 100, and opens and closes an inner space of the housing 100. The cover unit 200 according to the embodiment of the present disclosure may be formed in the shape of a plate disposed to face the open side of the housing 100. The cover unit 200 may be detachably coupled to the housing 100 through bolting coupling or the like. A specific shape of the cover unit 200 is not limited to the shape shown in FIGS. 1 to 3, and may be variously changed in design without departing from the technical spirit that the cover unit 200 has a shape capable of opening and closing the inner space of the housing 100.

The cover unit 200 is provided with an insertion hole unit 201 which is vertically penetrating upper and lower surfaces of the cover unit 200. The insertion hole unit 201 is provided as a plurality of insertion holes unit 201 that are disposed to be spaced apart from one another at a predetermined interval in a circumferential direction of the cover unit 200. The number of the insertion hoe units 201 and a cross-sectional shape of the insertion hole unit 201 may be variously changed in design according to the number of extension units 720 and the cross-sectional shape of the extension unit 720 provided in the retainer unit 700 to be described below.

The stator unit 300 is fixed to the inside of the housing 100, is supplied with electric power from the outside, and forms a magnetic field for rotating the rotor unit 400 to be described below. The stator unit 300 according to the embodiment of the present disclosure is formed in the shape of a hollow cylinder and is installed inside the housing 100. The stator unit 300 is disposed inside the housing 100, and has an outer circumferential surface that faces an inner circumferential surface of the housing 100. The stator unit 300 may be directly fixed to the inner circumferential surface of the housing 100 so as not to rotate about the central axis inside the housing 100 or may be fixed to the housing 100 by a separate fixing means. An annular yoke portion may be provided in the stator unit 300, and teeth around which a coil is wound from the yoke to the central direction may be provided in the stator unit 300. The teeth may be disposed at regular intervals in the outer circumferential surface of the yoke portion. A stator core may be formed by stacking a plurality of plates in the shape of a thin steel plate, and may be formed by coupling or connecting a plurality of split cores with each other.

The rotor unit 400 is rotatably installed inside the housing 100, and is disposed to face the stator unit 300. The rotor unit 400 rotates around the central axis thereof by electromagnetic interaction with the stator unit 300 and rotates the transmission shaft unit 500 to be described below.

The rotor unit 400 according to the embodiment of the present disclosure includes a rotor core 410, an accommodation unit 420, a connection unit 430, and a stress dispersion unit 440.

The rotor core 410 is formed in the shape of a hollow cylinder and is installed inside the housing 100. The rotor core 410 is disposed inside the housing 100 and has an outer circumferential surface that faces the inner circumferential surface of the stator unit 300. A central axis of the rotor core 410 is disposed coaxially with the central axis of the stator unit 300. A plurality of magnets may be attached to an outer circumferential surface of the rotor core 410. The plurality of magnets are disposed to be spaced apart from one another at a predetermined intervals in the circumferential direction of the rotor core 410. The plurality of magnets rotate the rotor core 410 around the central axis thereof in conjunction with electromagnetic force caused by a magnetic field generated from the stator unit 300.

The accommodation unit 420 is fixed to an inner circumferential surface of the rotor core 410. The accommodation unit 420 accommodates the power transmission unit 600 to be described below. The accommodation unit 420 according to the embodiment of the present disclosure is formed in the shape of a substantially cylinder, and has an outer circumferential surface that is disposed to face the inner circumferential surface of the rotor core 410. The accommodation unit 420 has the outer circumferential surface thereof fixed to the inner circumferential surface of the rotor core 410, and thus integrally rotates with the rotor core 410 when the rotor core 410 is rotated. The accommodation unit 420 is formed to have an inner empty space and one open side (upper side based on FIG. 3). The accommodation unit 420 has the central axis coaxially disposed with the central axis of the stator unit 300. A diameter and height of the inner space of the accommodation unit 420 may be changed in design to various values according to the size of the power transmission unit 600.

The connection unit 430 extends from the accommodation unit 420 and is connected to the transmission shaft unit 500 to be described below. When the rotor core 410 is rotated, the connection unit 430 rotates together with the accommodation unit 420 and transmits a rotational force of the rotor unit 400 to the transmission shaft unit 500. The connection unit 430 according to the embodiment of the present disclosure may be formed in the shape of a hollow cylinder which extends vertically from the closed side (lower side based on FIG. 3) of the accommodation unit 420. The connection unit 430 may be rotatably supported inside the housing 100 by a bearing or the like.

The stress dispersion unit 440 is provided between the accommodation unit 420 and the connection unit 430 so that a stress applied to the rotor unit 400 is dispersed. The stress dispersion unit 440 according to the embodiment of the present disclosure is disposed along a connection portion between the accommodation unit 420 and the connection unit 430. The stress dispersion unit 440 may be formed in the shape of an inclined surface to be inclined extending from the accommodation unit 420 to the connection unit 430. Accordingly, when the rotor unit 400 is rotated, the stress dispersion unit 440 may prevent a stress concentration phenomenon occurring at the boundary between the accommodation unit 420 and the connection unit 430.

The transmission shaft unit 500 is rotatably installed inside the housing 100. The transmission shaft unit 500 is connected to the rotor unit 400 and rotates about the central axis thereof in conjunction with the rotation of the rotor unit 400. The transmission shaft unit 500 according to the embodiment of the present disclosure may be formed in the shape of a shaft. The transmission shaft unit 500 is rotatably supported inside the housing 100 by a bearing or the like. The transmission shaft unit 500 may be disposed coaxially with the steering shaft 900 whose central axis is rotated by the steering wheel (not shown) of a vehicle. The transmission shaft unit 500 is inserted into the connection unit 430. An outer circumferential surface of the transmission shaft unit 500 may be press-fitted into an inner circumferential surface of the connection unit 430 or may be connected to the inner circumferential surface of the connection unit 430 by a spline tooth shape. Accordingly, the transmission shaft unit 500 may be integrally rotated together with the connection unit 430 when the rotor unit 400 is rotated.

The power transmission unit 600 is connected to the transmission shaft 500 and the steering shaft 900 to transmit the rotational force of the transmission shaft unit 500 to the steering shaft. The power transmission unit 600 is installed inside the rotor unit 400. Accordingly, the power transmission unit 600 may be located inside the housing 100, not outside the housing 100, thereby reducing the overall length of the steering reaction force apparatus 1 for a vehicle.

The power transmission unit 600 according to the embodiment of the present disclosure includes a sun gear unit 610, a planetary gear unit 620, a ring gear unit 630, and a carrier unit 640.

The sun gear unit 610 extends from the transmission shaft unit 500 and is disposed inside the accommodation unit 420 provided in the rotor unit 400. The sun gear unit 610 according to the embodiment of the present disclosure extends from an end of the transmission shaft unit 500 in an axial direction of the transmission shaft unit 500. The sun gear unit 610 has a gear tooth formed on an outer circumferential surface thereof so as to engage with the planetary gear unit 620 to be described below. The sun gear unit 610 is integrally coupled with the transmission shaft unit 500 and rotates together with the transmission shaft unit 500. When the transmission shaft unit 500 is manufactured, the sun gear unit 610 may be integrally formed with the transmission shaft unit 500, and unlike this, the sun gear unit 610 may be manufactured separately from the transmission shaft unit 500 and then connected to the transmission shaft unit 500.

The ring gear unit 630 is fixed to the inside of the housing 100 and is disposed to be spaced apart from the sun gear unit 610. The ring gear unit 630 may be made of a plastic material. Accordingly, the ring gear unit 630 may decrease an overall weight of the power transmission unit 600, and may reduce production costs.

The ring gear unit 630 according to the embodiment of the present disclosure includes a ring gear 631 and a flange unit 632.

The ring gear 631 is formed in the shape of a substantially cylinder and is disposed coaxially with the sun gear unit 610. The ring gear 631 is installed inside the accommodation unit 420, and has an inner circumferential surface disposed to face an outer circumferential surface of the sun gear unit 610 while spaced apart from the outer circumferential surface of the sun gear unit 610 at a predetermined interval. The ring gear 631 has a plurality of gear teeth protruding from the inner circumferential surface thereof and is engaged with the planetary gear unit 620 to be described below. The ring gear 631 has an outer surface disposed to face an inner surface of the accommodation unit 420 while spaced apart from the inner surface of accommodation unit 420 at a predetermined interval. Accordingly, the ring gear 631 may maintain the state without being interfered with the accommodation unit 420 when the rotor unit 400 is rotated. An upper diameter of the ring gear 631 may be formed larger than a lower diameter thereof.

The flange unit 632 extends from an upper end of the ring gear 631 in a radial direction of the ring gear 631. Accordingly, the flange unit 632 may be formed in the shape of an approximately disc. The flange unit 632 is has an upper surface disposed to face the lower surface of the cover unit 200.

The planetary gear unit 620 is provided between the sun gear unit 610 and the ring gear unit 630. The planetary gear unit 620 according to the embodiment of the present disclosure may be formed in the shape of a hollow cylinder having a gear tooth formed on the outer circumferential surface thereof. The planetary gear unit 620 is formed to have a diameter corresponding to an interval between the sun gear unit 610 and the ring gear 631. Both side surfaces of the planetary gear unit 620 are engaged with the outer circumferential surface of the sun gear unit 610 and the inner circumferential surface of the ring gear 631 for being combined therewith, respectively. The planetary gear unit 620 is inserted into one side of the carrier unit 640 to be described below and thus may be rotatably supported on the central axis thereof. The planetary gear unit 620 is provided as a plurality of planetary gear units 620 that are disposed to be spaced apart from one another at a predetermined interval in the circumferential direction of the sun gear unit 610 and the ring gear unit 630. The plurality of planetary gear units 620 rotate and revolve in conjunction with the rotational force of the sun gear unit 610, and rotate the carrier unit 640 to be described below.

One side of the carrier unit 640 is connected to the steering shaft 900 and the other side thereof is connected to the plurality of planetary gear units 620. The carrier unit 640 is rotated in conjunction with the orbital movement of the plurality of planetary gear units 620, and adds the steering reaction force to the steering shaft 900. The carrier unit 640 according to the embodiment of the present disclosure is rotatably installed inside the housing 100. The carrier unit 640 may be rotatably supported inside the housing 100 by a bearing or the like. The central axis of the carrier unit 640 is disposed on the same line as the central axes of the transmission shaft unit 500 and the steering shaft 900. One side (lower side based on FIG. 3) of the carrier unit 640 is formed in the shape of a plurality of pillar disposed to be spaced apart from each other at a predetermined interval along the circumferential direction of the carrier unit 640, and the plurality of pillars are inserted into the plurality of planetary gear units 620, respectively. Accordingly, the carrier unit 640 may be rotated about the central axis thereof as the plurality of planetary gear units 620 revolve. The other side (upper side based on FIG. 3) of the carrier unit 640 penetrates the cover unit 200 and protrudes outside the housing 100. The other side of the carrier unit 640 is press-fitted into or spline-coupled the end of the steering shaft 900 to finally transmit the rotational force generated from the rotor unit 400 to the steering shaft 900.

The retainer unit 700 is coupled to the cover unit 200 and the power transmission unit 600, and supports the power transmission unit 600 with respect to the cover unit 200 inside the housing 100. The retainer unit 700 may be made of a material having high rigidity such as a steel to firmly support the power transmission unit 600.

Figure 4:
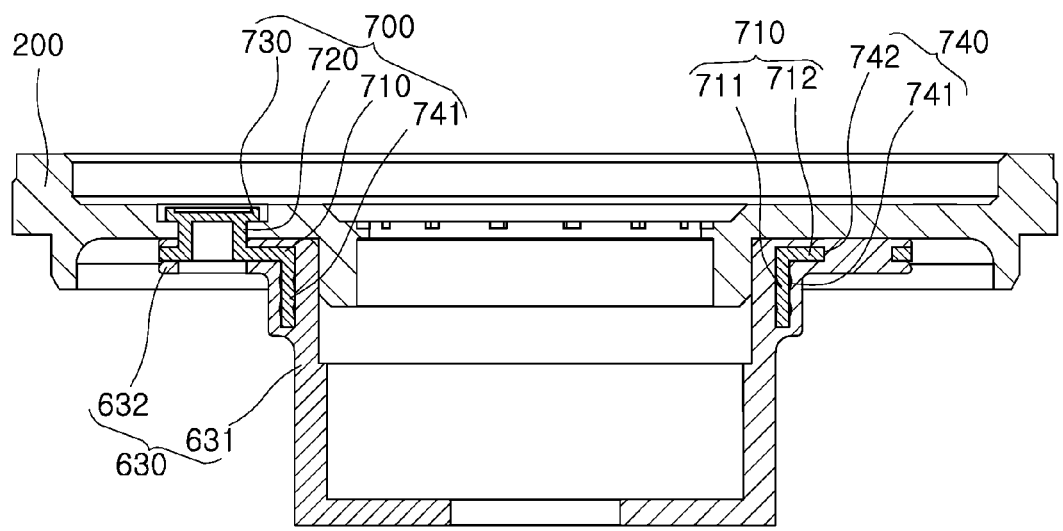
FIG. 4 is a cross-sectional view schematically illustrating an installation state of a retainer unit according to the embodiment of the present disclosure.
Figure 5:
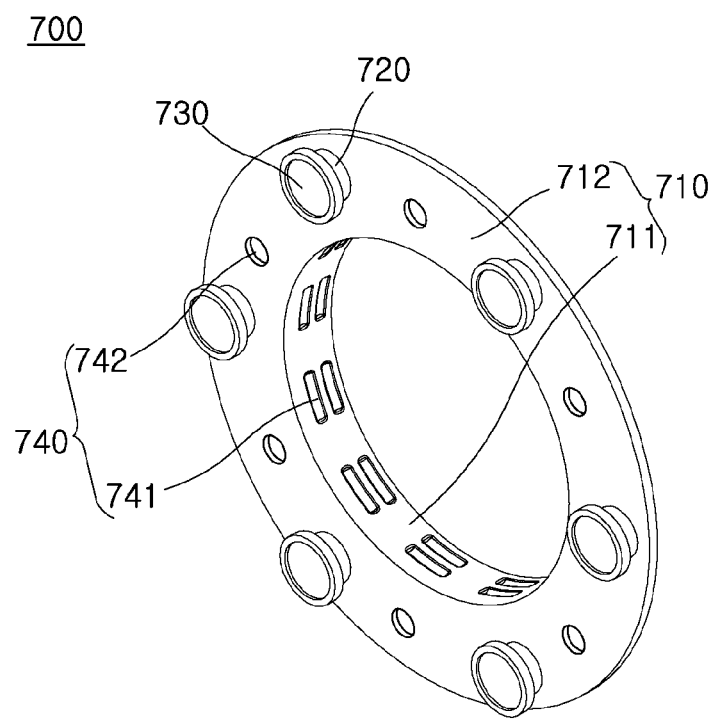
FIG. 5 is a perspective view schematically illustrating the configuration of the retainer unit according to the embodiment of the present disclosure.
Figure 6:
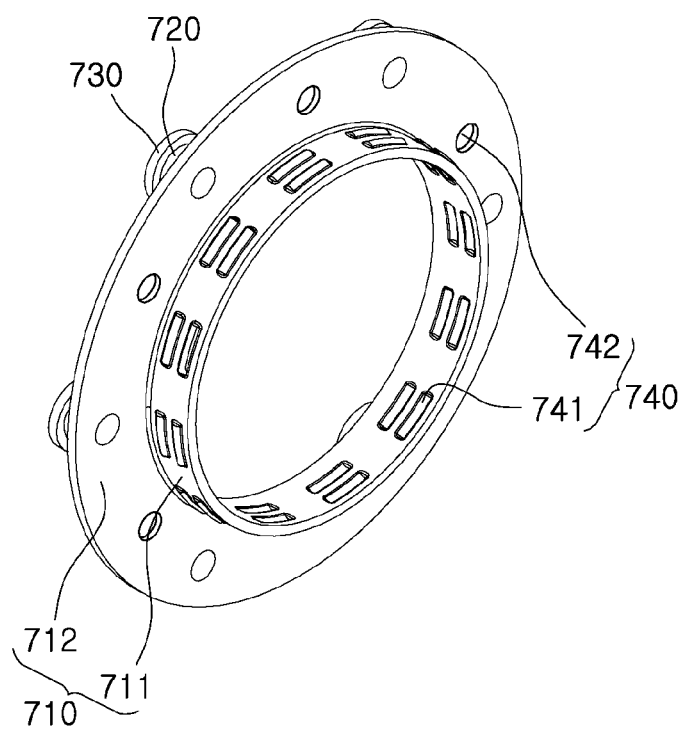
FIG. 6 is a bottom perspective view schematically illustrating the configuration of the retainer unit according to the embodiment of the present disclosure.

FIG. 4 is a cross-sectional view schematically illustrating an installation state of the retainer unit according to the embodiment of the present disclosure, FIG. 5 is a perspective view schematically illustrating the configuration of the retainer unit according to the embodiment of the present disclosure. FIG. 6 is a bottom perspective view schematically illustrating the configuration of the retainer unit according to the embodiment of the present disclosure.

Referring to FIGS. 4 to 6, the retainer unit 700 according to the embodiment of the present disclosure includes a body unit 710, an extension unit 720, a caulking unit 730, and a reinforcing unit 740.

The body unit 710 is fixed to the inside of the ring gear unit 630, and entirely supports the extension unit 720, the caulking unit 730, and the reinforcing unit 740 to be described below. As the ring gear unit 630 is made of a plastic material, the body unit 710 may be fixed to the inside of the ring gear unit 630 by insert injection. The body unit 710 according to the embodiment of the present disclosure may include a first body 711 and a second body 712.

The first body 711 has an outer appearance of one side of the body unit 710 and is disposed inside the ring gear 631. The first body 711 according to the embodiment of the present disclosure is formed in the shape of a hollow cylinder and is fixed to the inside of the ring gear 631 when the ring gear unit 630 is injection-molded. The first body 711 has the central axis thereof that coincides with the central axis of the ring gear 631. A diameter of the first body 711 has a value between the inner circumferential surface diameter and the outer circumferential surface diameter of the ring gear 631.

The second body 712 forms an outer appearance of the other side of the body unit 710 and is disposed inside the flange unit 632. The second body 712 according to the embodiment of the present disclosure may be formed in the shape of a disc that horizontally extends in a radial direction of the first body 711 from an upper end of the first body 711. The second body 712 is fixed to the inside of the flange unit 632 during injection molding of the ring gear unit 630.

The extension unit 720 extends from the body unit 710 and is inserted through the cover unit 200. The extension unit 720 may be provided as a plurality of extension units 720. In this case, the plurality of extension units 720 may be disposed to be spaced apart from one another at a predetermined intervals in the circumferential direction of the body unit 710. The extension unit 720 according to the embodiment of the present disclosure may be formed in the form of a column that extends vertically from the upper surface of the second body 712 to the lower surface of the cover unit 200. The extension unit 720 is inserted into the insertion hole unit 201 formed in the cover unit 200 and vertically penetrates the cover unit 200. A length of the extension unit 720 is formed to be larger than a vertical height of the cover unit 200. When the extension unit 720 is inserted into the insertion hole unit 201, the upper end portion protrudes upward from the cover unit 200. Accordingly, the extension unit 720 may support in a manner that the caulking unit 730 to be described below bring into contact with the upper surface of the cover unit 200.

The caulking unit 730 is disposed on the end of the extension unit 720 and contacts the cover unit 200 to support the ring gear unit 630 inside the housing 100.

Figure 7:
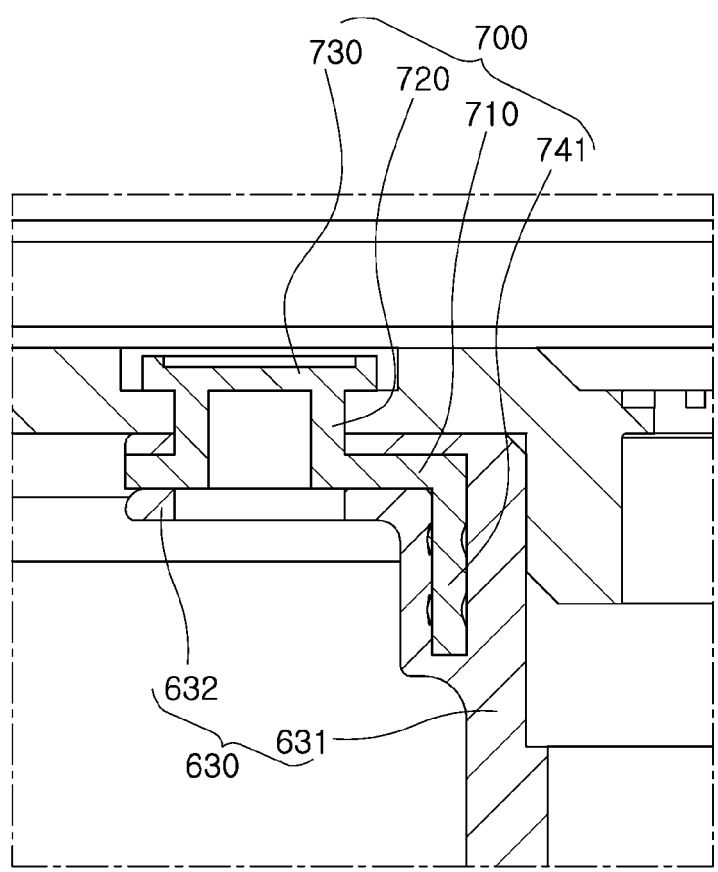
FIG. 7 is an enlarged view schematically illustrating the configuration of a caulking unit according to the embodiment of the present disclosure.
Figure 8A:
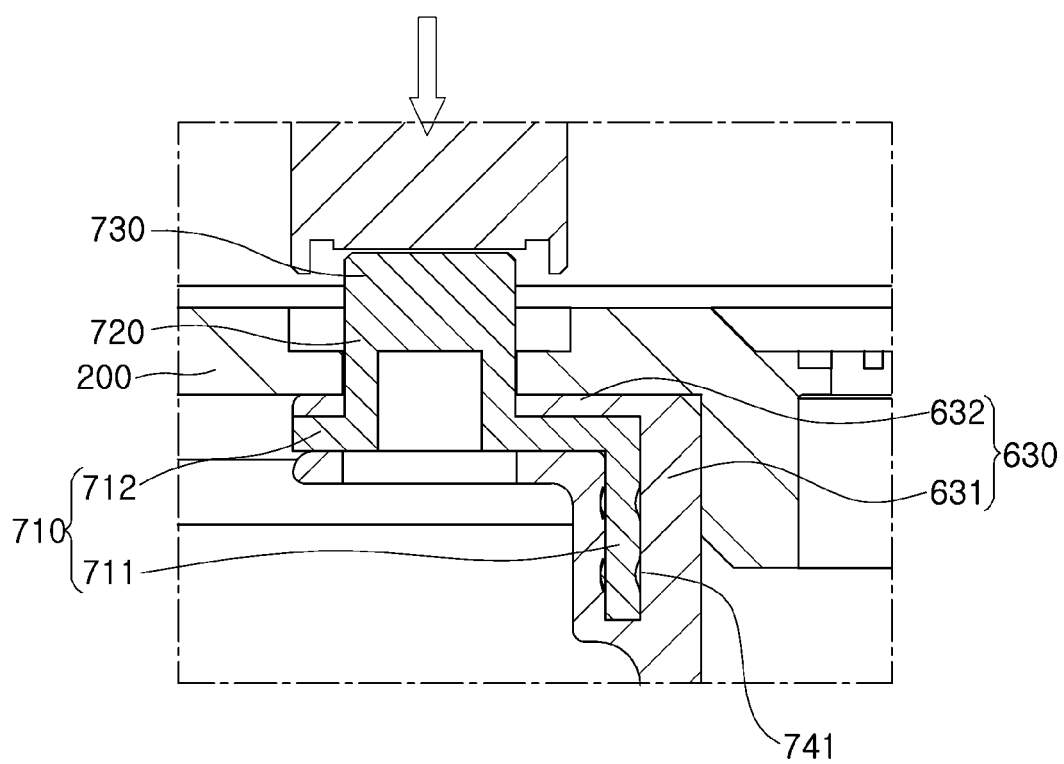
FIGS. 8A and 8B are a view schematically illustrating a forming process of the caulking unit according to the embodiment of the present disclosure.
Figure 8B:
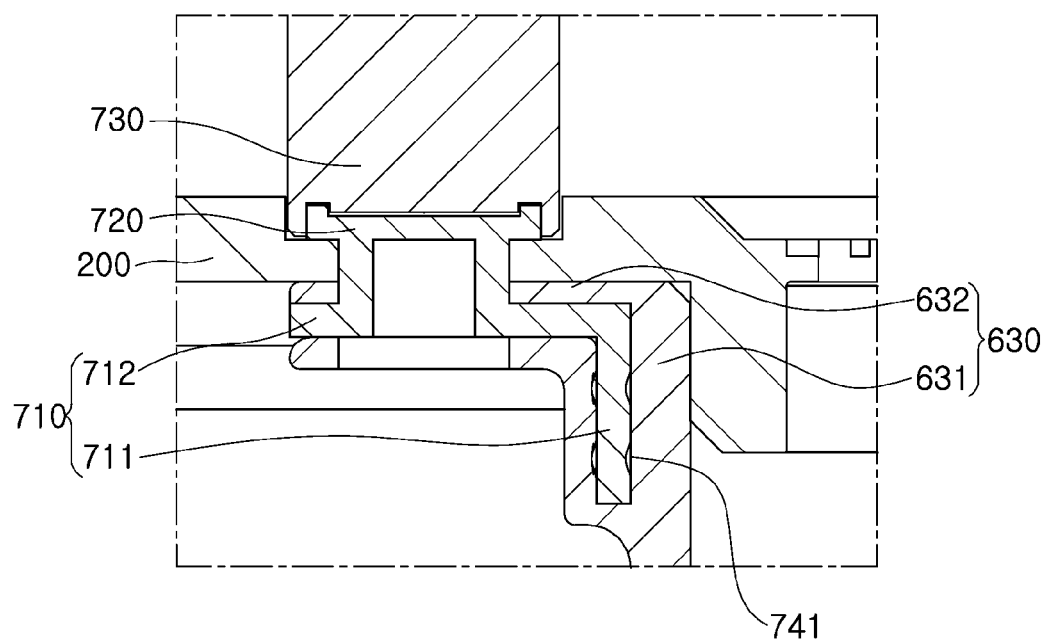

FIG. 7 is an enlarged view schematically illustrating the configuration of the caulking unit according to the embodiment of the present disclosure, and FIGS. 8A and 8B are a view schematically illustrating a forming process of the caulking unit according to the embodiment of the present disclosure.

Referring to FIGS. 7, 8A and 8B, the caulking unit 730 according to the embodiment of the present disclosure may be formed in the shape of a disc having a larger diameter than the extension unit. A lower surface of the caulking unit 730 are brought into contact with the upper surface of the cover unit 200, and the caulking unit 730 is locked and coupled to the cover unit 200. The caulking unit 730 supports the ring gear unit 630 into the housing by restricting a relative movement of the extension unit 720 to the cover unit 200. In a state where the extension unit 720 is inserted into the insertion hole unit 201, the caulking unit 730 may be formed by deforming the upper end of the extension unit 720 by a pressing means such as a press. The caulking unit 730 may be provided as a plurality of caulking units 730 that are formed at the upper ends of the plurality of extension units 720, respectively.

The reinforcing unit 740 is provided in the body unit 710, and reinforces the fixing force of the body unit 710 with respect to the ring gear unit 630. Accordingly, the reinforcing unit 740 may improve fixed performance and durability performance between the body unit 710 and the ring gear unit 630 formed of different materials from each other.

Figure 9:
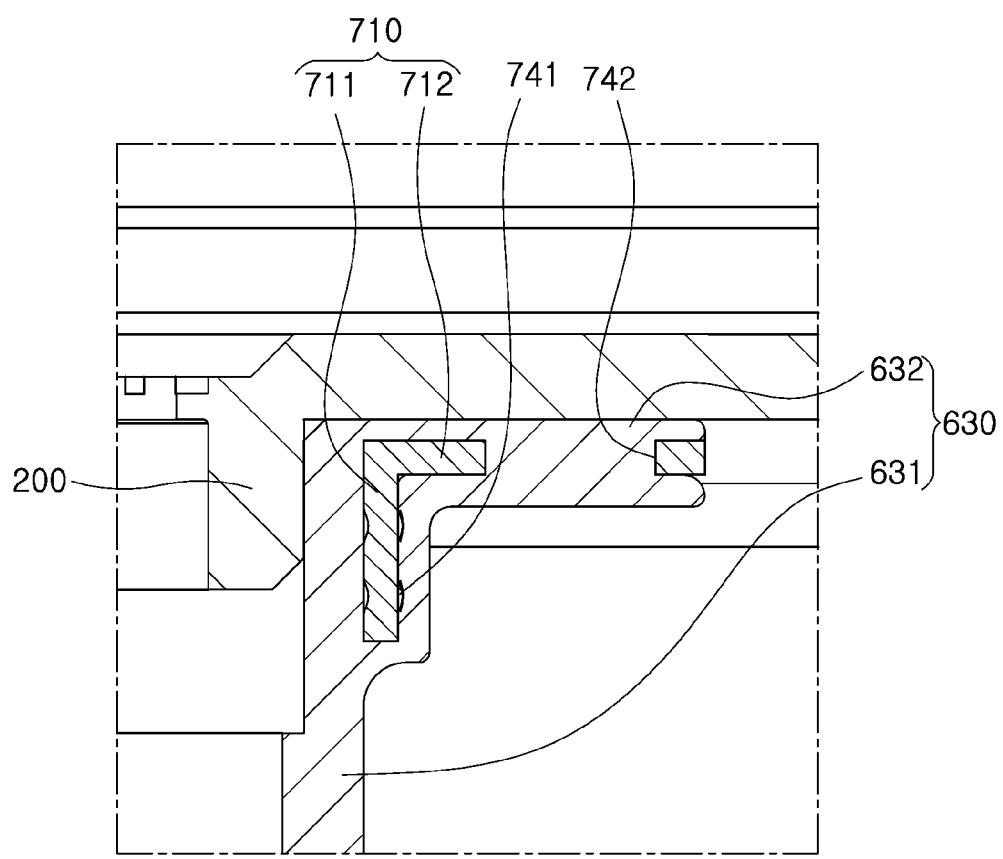
FIG. 9 is an enlarged view schematically illustrating the configuration of a reinforcing unit according to the embodiment of the present disclosure.

FIG. 9 is an enlarged view schematically illustrating the configuration of the reinforcing unit according to the embodiment of the present disclosure.

Referring to FIG. 9, the reinforcing unit 740 according to the embodiment of the present disclosure includes an embossing unit 741 and a penetration unit 742.

The embossing unit 741 protrudes to the outside of the body unit 710 to prevent a relative movement of the ring gear unit 630 to the body unit 710. More specifically, the embossing unit 741 forms a locking structure with the ring gear unit 630 on the surface of the body unit 710 to prevent the ring gear unit 630 from moving in the axial direction and the circumferential direction, thereby reinforcing the fixing force of the body unit 710 with respect to the ring gear unit 630. The embossing unit 741 according to the embodiment of the present disclosure may be formed in the shape of a protrusion having one side protruding convexly from an outer circumferential surface of the first body 711 and the other side concavely recessed into the inner circumferential surface of the first body 711. When the ring gear unit 630 is injected, one side of the embossing unit 741 is recessed into an injection product forming the ring gear 631, and the injection product forming the ring gear 631 is introduced into the other side of the embossing unit 741. Accordingly, the embossing unit 741 may be coupled to the ring gear 631 in a form similar to a tooth-fitting structure of the gear to reinforce a coupling force between the ring gear unit 630 and the body unit 710. The embossing unit 741 is provided as a plurality of embossing units 741 that disposed to be spaced apart from one another at a predetermined intervals in the circumferential direction of the ring gear unit 630 or the first body 711. The plurality of embossed units 741 disposed along the circumferential direction of the ring gear unit 630 may be disposed in at least two rows in the axial direction of the ring gear unit 630. Accordingly, the embossing unit 741 may prevent the ring gear unit 630 from moving in the circumferential direction and the axial direction. FIG. 9 illustrates that the embossed unit 741 is formed in the first body 711, but unlike this, the embossed unit 741 may be formed in the second body 712.

The penetration unit 742 is formed to penetrate the body unit 710 to prevent the relative movement of the ring gear unit 630 to the body unit 710. More specifically, the penetration unit 742 forms a locking structure with the ring gear unit 630 in the body unit 710 to prevent the ring gear unit 630 from moving, thereby reinforcing the fixing force of the body unit 710 with respect to the ring gear unit 630. The penetration unit 742 according to the embodiment of the present disclosure may be formed in the shape of a hole vertically penetrating the upper and lower surfaces of the second body 712. The penetration unit 742 introduces the injection product forming the flange unit 632 from both sides of the second body 712 into the second body 712 when the ring gear unit 630 is injected. Accordingly, the second body 712 is coupled to the flange unit 632 in a form approximately similar to a pin coupling, thereby reinforcing the coupling force between the ring gear unit 630 and the body unit 710. The penetration unit 742 is provided as a plurality of penetration units 742 that are disposed to be spaced apart from one another at a predetermined intervals along the circumferential direction of the ring gear unit 630 or the second body 712. Accordingly, the penetration unit 742 may prevent the ring gear unit 630 from moving in the circumferential direction and the axial direction. FIG. 9 illustrates that the penetration unit 742 is formed in the second body 712, but unlike this, the penetration unit 742 may be formed in the first body 711.

Hereinafter, the configuration of a steering reaction force apparatus 1 for a vehicle according to another embodiment of the present disclosure will be described.

In this process, for convenience of description, a description overlapping the steering reaction force apparatus 1 for a vehicle according to the aforementioned embodiment of the present disclosure will be omitted.

The reinforcing unit 740 according to the another embodiment of the present disclosure includes a rolling unit 743.

The rolling unit 743 extends from the body unit 710 and protrudes to the outside of the ring gear unit 630. The rolling unit 743 is bent toward the outer circumferential surface of the ring gear unit 630, and is brought into close contact with the ring gear unit 630 to prevent the relative movement of the ring gear unit 630 to the body unit 710, thereby reinforcing the fixing force of the body unit 710 to the ring gear unit 630.

Figure 10:
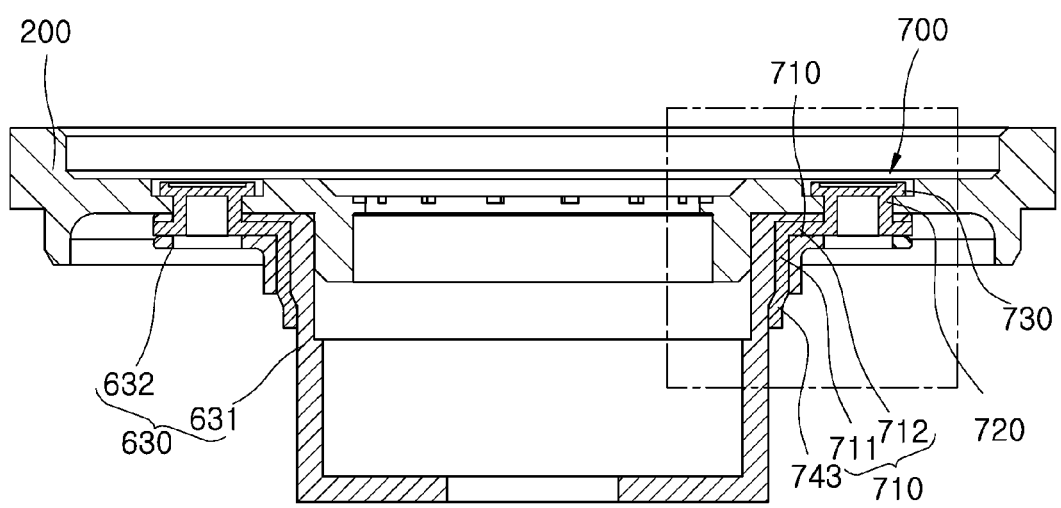
FIG. 10 is a cross-sectional view schematically illustrating the configuration of a rolling unit according to the embodiment of the present disclosure.
Figure 11A:
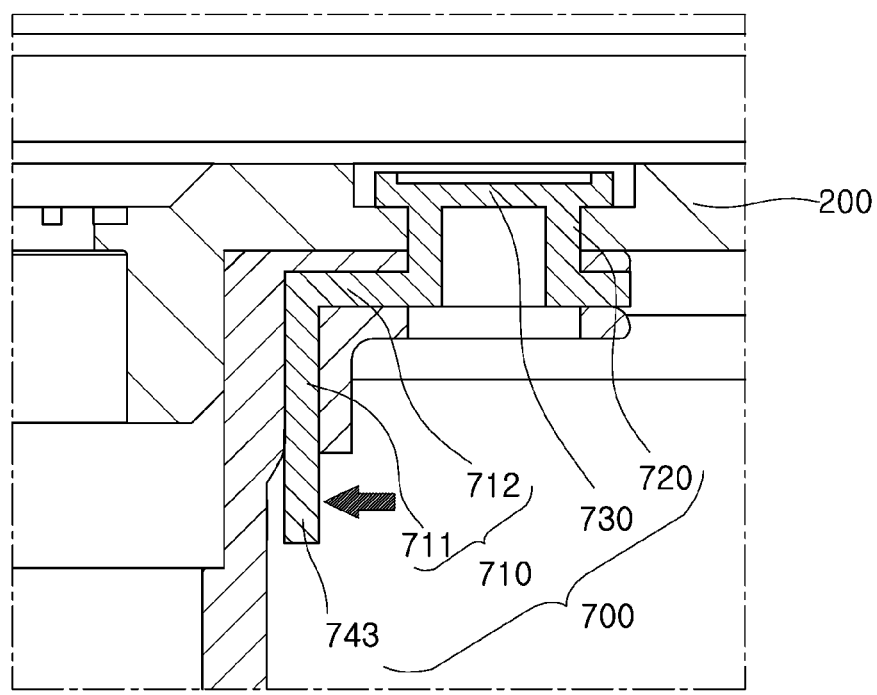
FIGS. 11A and 11B are a diagram schematically illustrating a forming process of the rolling unit according to the embodiment of the present disclosure.
Figure 11B:
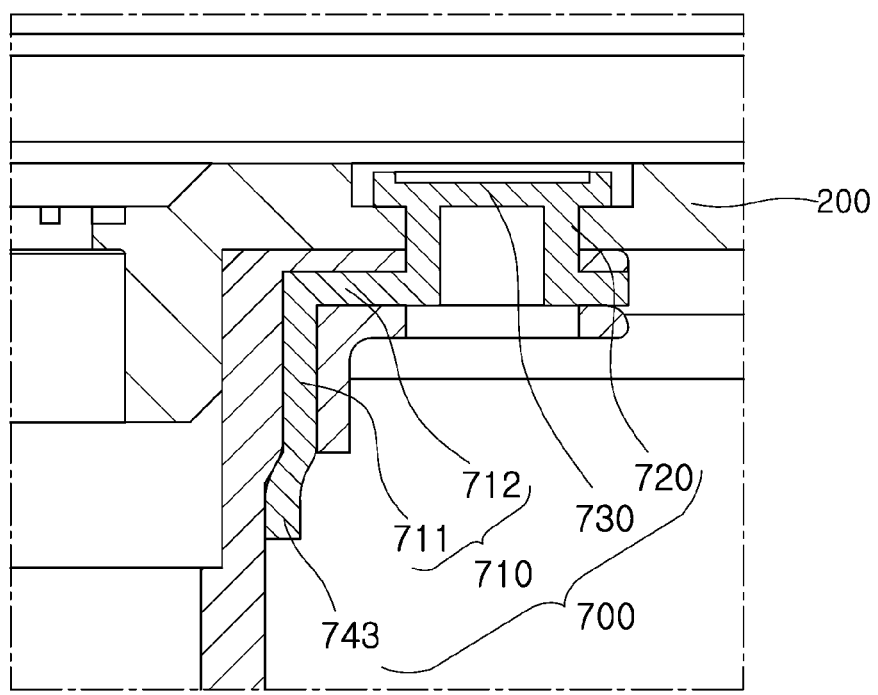

FIG. 10 is a cross-sectional view schematically illustrating the configuration of the rolling unit according to the embodiment of the present disclosure, and FIGS. 11A and 11B are a diagram schematically illustrating a forming process of the rolling unit according to the embodiment of the present disclosure.

Although FIGS. 10, 11A and 11B illustrate that the reinforcing unit 740 includes only the rolling unit 743, the reinforcing unit 740 may include all of the embossing unit 741, the penetration unit 742, and the rolling unit 743.

Referring to FIGS. 10 and 11, the rolling unit 743 according to the embodiment of the present disclosure may be formed in the shape a hollow cylinder extending from the lower end of the body unit 710 in the axial direction of the body unit 710. As the diameter of the upper side of the ring gear 631 is larger than the diameter of the lower side thereof, the lower end of the rolling unit 743 protrudes from the upper side of the ring gear 631 and is disposed to face the lower outer circumferential surface of the ring gear 631. The rolling unit 743 may be formed to have the same diameter as the diameter of the body unit 710. After an injection molding of the ring gear unit 630 is completed, the diameter of the rolling unit 743 may be decreased by a pressing means such as a press, and the rolling unit 743 may be brought into close contact with the outer circumferential surface of the ring gear 631.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A steering reaction force apparatus for a vehicle, comprising:
   a housing configured to be openable and closable by a cover unit;
   a stator unit fixed to an inside of the housing;
   a rotor unit disposed to face the stator unit and configured to be rotated by electromagnetic interaction with the stator unit;
   a transmission shaft unit connected to the rotor unit and configured to rotate in conjunction with the rotor unit;
   a power transmission unit disposed inside the rotor unit and configured to transmit a rotational force of the transmission shaft unit to a steering shaft; and
   a retainer unit configured to support the power transmission unit with respect to the cover unit,
   wherein the rotor unit comprises:
   a rotor core,
   an accommodation unit fixed to an inner circumferential surface of the rotor core and configured to accommodate the power transmission unit, and
   a connection unit extended from the accommodation unit and connected to the transmission shaft unit.

2. The steering reaction force apparatus of claim 1, wherein the rotor unit comprises:
   a stress dispersion unit extended from the accommodation unit and inclined at an angle with respect to the connection unit.

3. The steering reaction force apparatus of claim 1, wherein the power transmission unit comprises:
   a sun gear unit extended from the transmission shaft unit and disposed inside the accommodation unit;
   a ring gear unit spaced apart from the sun gear unit;
   a plurality of planetary gear units disposed between the sun gear unit and the ring gear unit, and configured to rotate and revolve in conjunction with a rotational force of the sun gear unit; and
   a carrier unit connected to the steering shaft and configured to rotate in conjunction with a revolution of the plurality of planetary gear units.

4. The steering reaction force apparatus of claim 3, wherein the ring gear unit is comprised of a plastic material.

5. The steering reaction force apparatus of claim 3, wherein the ring gear unit comprises:
   a ring gear disposed inside the accommodation unit and having an inner circumferential surface engaged with the planetary gear unit; and
   a flange unit extended from the ring gear and facing the cover unit.

6. The steering reaction force apparatus of claim 5, wherein the retainer unit comprises:
   a body unit fixed to an inside of the ring gear unit;
   an extension unit extended from the body unit and inserted through the cover unit; and
   a caulking unit disposed at an end of the extension unit, in contact with the cover unit, and configured to support the ring gear unit.

7. The steering reaction force apparatus of claim 6, wherein the body unit is insert-injected into the ring gear unit.

8. The steering reaction force apparatus of claim 7, wherein the body unit comprises:
   a first body fixed to the inside of the ring gear; and
   a second body extended from the first body and fixed to an inside of the flange unit.

9. The steering reaction force apparatus of claim 6, wherein the caulking unit is has a diameter larger than a diameter of the extension unit so that a bottom surface of the caulking unit contacts an upper surface of the cover unit.

10. The steering reaction force apparatus of claim 6, wherein the retainer unit comprises:
    a reinforcing unit disposed in the body unit and configured to reinforce a fixing force of the body unit with respect to the ring gear unit.

11. The steering reaction force apparatus of claim 10, wherein the reinforcing unit comprises:
    a plurality of embossing units protruding to the outside of the body unit and spaced apart from one another at intervals along a circumferential direction of the ring gear unit.

12. The steering reaction force apparatus of claim 11, wherein the embossing units are arranged in at least two rows along an axial direction of the ring gear unit.

13. The steering reaction force apparatus of claim 11, wherein the reinforcing unit comprises:
a plurality of penetration units formed through the body unit and spaced apart from one another at intervals along the circumferential direction of the ring gear unit.

14. The steering reaction force apparatus of claim 10, wherein the reinforcing unit comprises:
a rolling unit protruding from the body unit to an outside of the ring gear unit, and bent toward an outer circumferential surface of the ring gear unit to be in close contact with the ring gear unit.

\* \* \* \* \*